April 8, 1930.  M. C. RECK  1,753,719
BROILER RACK
Filed June 8, 1929   2 Sheets-Sheet 1

INVENTOR
Maurus C. Reck
BY
Cumpston + Griffith
his ATTORNEYS

April 8, 1930.　　　M. C. RECK　　　1,753,719
BROILER RACK
Filed June 8, 1929　　　2 Sheets-Sheet 2
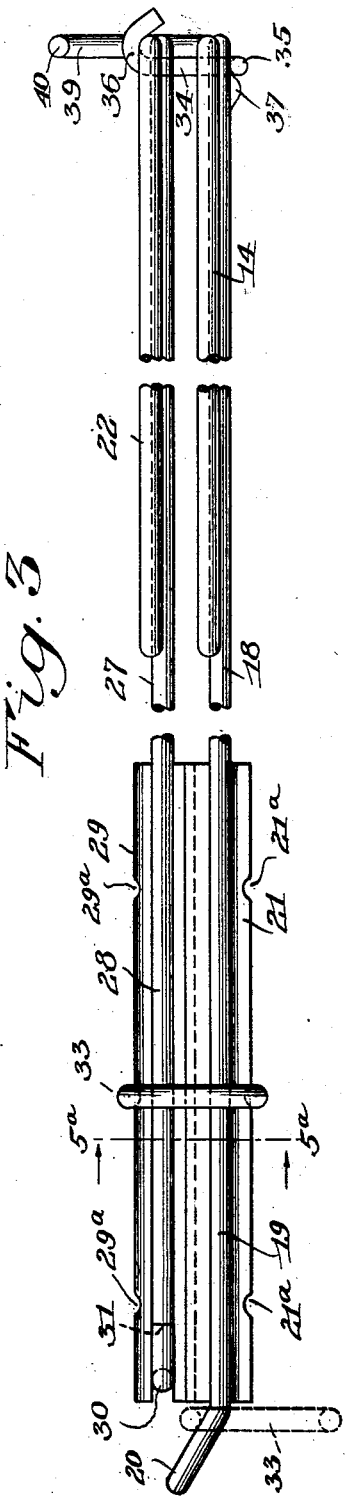
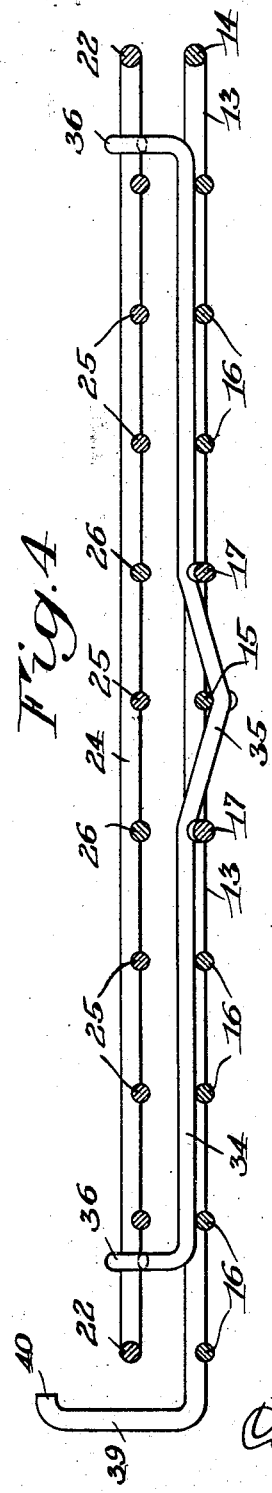
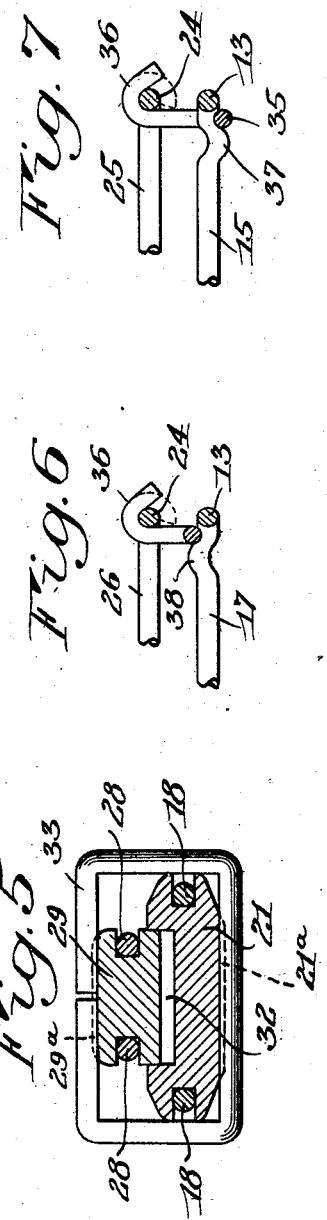
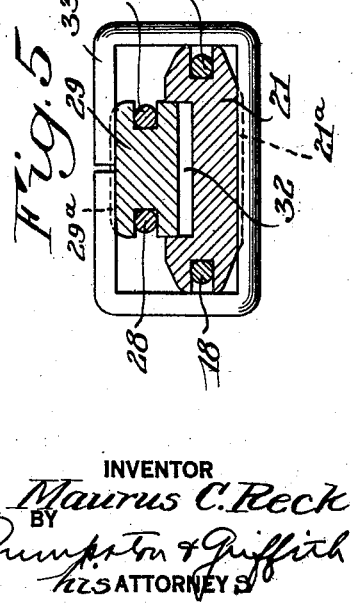
INVENTOR
Maurus C. Reck
BY
Crumpton & Griffith
his ATTORNEYS Patented Apr. 8, 1930

1,753,719

UNITED STATES PATENT OFFICE

MAURUS C. RECK, OF ROCHESTER, NEW YORK, ASSIGNOR TO STERLING RANGE & FURNACE CORPORATION, OF ROCHESTER, NEW YORK, A CORPORATION OF NEW YORK

BROILER RACK

Application filed June 8, 1929. Serial No. 369,352.

The present invention relates to broiler racks and has for its object to provide an improved rack or grid which is of simple construction comparatively inexpensive to manufacture and efficient in service.

A further object of the invention is to provide in broiler racks or cooking utensils of this class, improved means for preventing the hands of the user from coming in contact with the metal extensions of the rack forming the handle portions thereof which become more or less heated while in service and to such an extent as to require the use of a pad or cloth for protecting the hands against burning.

A further object of the invention is to provide improved means for connecting the opposing sections of the rack or grid which will permit them to readily accommodate themselves to food portions of varying thickness placed therebetween.

A further object of the invention is to provide an improved yieldable element between the grid sections which will permit them to be quickly brought into assembled relation and which will operate in such a manner as to make it unnecessary to employ manually adjustable means to regulate the distance between the sections and which will also permit one section to swing relative to another.

A further object of the invention is to provide in broiler racks of the class described improved connecting means for the adjustable sections of the rack together with means for conveniently supporting a drip pan upon one of the sections.

To these and other ends the invention resides in certain improvements and combinations of parts, all as will be hereinafter more fully described, the novel features being pointed out in the claims at the end of the specification.

In the drawings:

Fig. 3 is a fragmentary side view drawn to an enlarged scale and showing the sections in assembled relation;

Fig. 4 is a transverse section taken on line $4^a$—$4^a$ of Fig. 2;

Fig. 5 is a transverse section through the handle of the rack taken on line $5^a$—$5^a$ of Fig. 3;

Fig. 6 is a detailed section taken on line $6^a$—$6^a$ of Fig. 2, and

Fig. 7 is a section taken on line $7^a$—$7^a$ of Fig. 2.

Similar reference numerals throughout the several views indicate the same parts.

Figure 1:
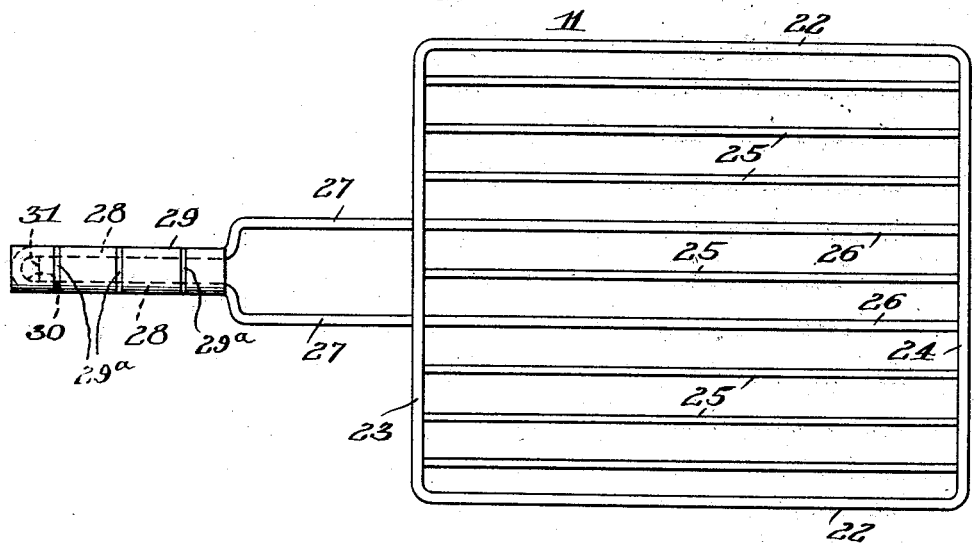
Fig. 1 is a plan view of one of the frame sections of the rack.

In the present embodiment of the invention my improved broiler rack may be used either in a horizontal or a vertical position, but is preferably intended for use in an upright position within a relatively narrow vertically disposed broiling chamber, (not shown).

Referring to the drawings, 10 and 11 represent generally a pair of frames or frame-like sections one of which comprises what may be termed a base section and the other a detachable hinged section carried thereby. The base section 10 preferably comprises front and rear portions 12 and 13 respectively connected by side portions 14, said portions preferably being of a one piece construction formed of relatively heavy wire or other suitable material. The end portions are suitably connected by a central rod 15 and a plurality of spaced rods 16 on opposite sides thereof. The end portions 12 and 13 are further connected by rods 17 having extended handle portions 18 terminating in a loop, the side portions 19 of which are brought relatively close together while the bent portion 20 of the loop is inclined relative to the handle portion as shown in Fig. 3 for a purpose hereafter described. The loop is arranged to receive a hand grip section 21 constructed of a suitable non-heat conducting material preferably of wood, and in the sides of which are formed grooves for receiving the portions 19 of the loop as best shown in Fig. 5.

Figure 2:
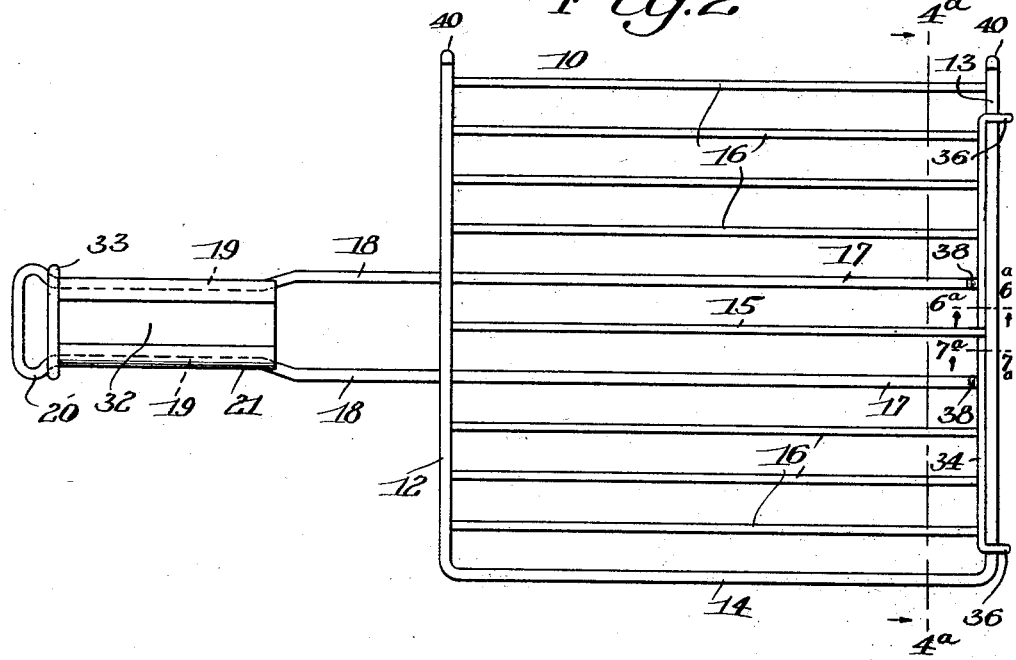
Fig. 2 is a similar view of the opposite section thereof.

The frame 11 which is substantially the same in size as the frame 10, comprises a rectangular border member the sides 22 of which are connected by front and rear end portions 23 and 24 respectively which are also connected by a plurality of rods 25, the ends of which are preferably secured by spot welding. The end portions 23 and 24 are further connected by rods 26 having extended handle portions 27 terminating in a loop the side portions 28 of which are brought relatively close together and disposed within longitudinal grooves formed in the sides of a hand grip section 29 which is also preferably made of wood. The bent portion 30 of the loop serves to prevent outward movement of the hand grip section 29, said bent portion lying within a transverse slot cut in the outer end of said hand grip section. That portion of the section lying between the side portions 28 of the loop has an outer end portion 31 and since the bent portion 30 lies within the path of the portion 31 the hand grip section 29 is prevented from being withdrawn by an outward movement as will be understood. The hand grip section 29 is slipped into position upon the loop after first placing it between the side portions 27 of the handle and moving it outwardly in the plane of the loop to the position shown in Fig. 1. The hand grip section 21 is also applied by placing it between the rods 18 and moving it outwardly in the plane of the loop until it is arrested by the bent portion 20 thereof. Frictional resistance between the loops and the hand grip sections is sufficient to hold the latter against rearward movement from the position shown in Figs. 1 and 2. The hand grip section 21 is provided with a slot or longitudinally extending recess 32 for the reception of the section 29 of the handle as best shown in Figs. 2 and 5. A slide ring 33 serves to retain the handle sections in proper relationship when the frames of the rack are assembled and closed as shown in Fig. 3. To release the sections the ring is moved to the dotted line position shown in Fig. 3 in which it is held by the inclined portion 20 of the handle extension of the base frame 10. The bent portion 20 is of a size sufficient to prevent withdrawal of the ring 33 from the outer end of the loop as will be apparent from the relationship of the parts as indicated in Fig. 2.

At the back of the frame section 10 is provided improved means for hingedly connecting the frame section 11 therewith to render the latter both detachable and self adjusting, whereby to compensate for articles of food varying in thickness which may be placed between the sections from time to time. This means comprises preferably a single yieldable element 34 in the form of a rod constructed of spring material which has a bowed portion 35 intermediate its ends extending beneath and engaging an abutment connected with the transverse bar 13 such for example as the center rod 15. The spring on the opposite sides of the bowed portion 35 is adapted to overlie and to normally rest upon additional abutments preferably embodying certain of the connecting rods between the transverse portions of the frame, such as the rods 17 as shown in Figs. 2 and 4, or other suitable means on the transverse bar 13. The outer ends of the spring 34 are bent upwardly to form hooks 36 for receiving the rear border portion 24 of the frame section 11 as shown in Figs. 6 and 7 whereby said section may be readily connected with and removed from the base section 10. The offset of the bowed portion 35 of the spring is somewhat less than the distance between the bottom of the rod 15 and the top of the rods 17, Fig. 4, whereby when the spring is in the position shown in Figs. 2 and 4, it will necessarily be under tension thereby affording a gripping or clamping action between the center abutment or rod 15 and the spaced rods or abutments 17 which is sufficient at all times to hold the spring in upright position. The hooks 36 will therefore remain in position to receive the rear transverse bar 24 of the self adjusting frame 11 so that said frame can be quickly applied and detached when desired. However if preferred, frame 11 may be permanently hinged to the base frame merely by bending the extremities of the hooks around the bar 24 as indicated by dotted lines in Figs. 6 and 7. The spring 34 is placed immediately in front of the transverse member 13 which serves to prevent rearward displacement of the spring.

In order to prevent a possible sliding movement of the spring in a direction away from the bar 13 there is formed on the central rod 15 a shoulder or abutment 37 and for the same purpose similar abutments or shoulders 38 are formed on the rods 17, said abutments being preferably formed by slightly offsetting the rods 15 and 17 at the points indicated in Figs. 6 and 7.

The transverse bars 12 and 13 of the base frame section have their ends bent or turned upwardly to afford arms 39 as best shown in Fig. 4. The arms are spaced from the side bars 16 and 22 of the lower and upper frames respectively and are adapted when the rack is used in an upright position to receive the ends of a drip pan (not shown) which will occupy a position directly beneath the rack in position to catch the drippings from the meat held between the frame sections 10 and 11. The arms are provided to extend beneath projecting lugs on the ends of the drip pan but may engage the pan at any desired point. The arms are provided with projecting portions 40 which serve to prevent lateral displacement of the drip pan in one direction, the pan being removable merely by lifting it slightly and withdrawing it from the rack.

In the operation of the rack, assuming that the parts are in the position shown in Fig. 3, it is first necessary to slide the ring 33 to the dotted line position shown, after which the top or hinged frame having the hand grip 29 may be swung upwardly about the axis of its transverse bar 24 to allow the meat or other food products to be placed upon the lower or base frame 10. This having been done the upper frame is swung downwardly to closed position during which operation the relatively narrow hand grip section 29 will be moved into the recess 32 of the hand grip section 21 and preferably to the bottom thereof to make it easier to slip the ring 33 over the ends of said members and to slide it thereon to retaining position. Upon completing this operation and releasing the hand grips the resistance offered by the meat between the frames tends to spread them apart and to urge the transverse member 24 into engagement with the hooks 36 and the hand grip section 29 into engagement with the ring 33 as shown in Fig. 5. Where relatively thick steaks or other meat portions are placed between the frames the spring will readily yield, thus permitting said frames to accommodate themselves to such portions. Heretofore it has been customary to provide separate hinge portions of different depths for connecting the frames, or some manually adjustable arrangement for taking care of a variation in thickness of the meat portions to be cooked from time to time. The present arrangement makes it unnecessary to provide such means since the spring is self adjusting and requires no attention on the part of the user.

While the hand grips are shown constructed of wood, they may be made of any other non-heat conducting material suitable for the purpose. By grooving or recessing one of the hand grip sections and positioning the other therein, not only can the thickness of the handle be kept within the desired limits but the arrangement is such as to insure proper centering of the frames since the sliding ring cannot be moved to retaining position until the upper hand grip section has been moved into the groove of the lower section which insures proper alignment of the frames. Since the side rods of the loops comprising the extended handle portions are disposed within grooves formed in the hand grip sections the user can grip the latter without having his hands come in contact with the metal portions of the handle.

An important feature of the invention is the construction of the grid in such a manner as to insure sufficient pressure upon the food portions placed between the hinged sections, whether of relatively thin or thick proportions, whereby when the grid is used in an upright position the dropping down of the meat or other food portions will be prevented. As explained above, this is accomplished by means of the spring 34 connecting the sections at one end and the yieldable split ring 33 connecting them at the other end.

The handle sections 21 and 29 are provided with oppositely disposed alined notches or grooves 21ª and 29ª, respectively, for receiving the retaining ring 33 to insure its retention in different positions of adjustment upon the handle. The notches are spaced at suitable intervals and are of a depth sufficient to prevent accidental displacement of the ring longitudinally of the handle. The notches, however, may be varied in depth to permit of a slight variation in the distance between the grid sections according to the thickness of the food portions placed therebetween. Furthermore, when the food portions are relatively thin the split ring may be adjusted upon the handle to a position between the notches in order to bring the grid sections somewhat closer together whereby to better accommodate them to said relatively thin food portions.

While I have shown the rack constructed of grid-like frames it will be understood that the manner of forming the relatively movable sections of the rack and the material used therein may be varied as desired within the scope of the appended claims.

I claim as my invention:

1. A broiler rack comprising a pair of adjacently mounted frames, yieldable means connecting the frames whereby they will accommodate themselves to food portions of various thicknesses placed therebetween, said yieldable means being tensioned to engage different portions of one frame whereby it is held thereon against displacement and means forming a handle for the frame.

2. A broiler rack comprising a pair of adjacently mounted frames having handle portions extending forwardly therefrom, one of said frames having spaced abutments thereone, yieldable means connecting the rear portions of the frames and permitting one frame to swing relative to another, said yieldable means engaging said abutments and being held against displacement thereby, and means for releasably connecting said handle portions.

3. A broiler rack comprising a pair of adjacently mounted frames, a yieldable connecting element for the frames secured upon one and permitting the other to be detached therefrom, said element extending transversely of and permitting said frames to accommodate themselves to food portions of various thicknesses placed therebetween, and means forming a handle for the rack.

4. A broiler rack comprising a pair of adjacently mounted frames, one of which is provided with spaced abutments, a yieldable element extending transversely of the frames having its ends engaging one of the frames and an intermediate portion engaging the abutments of the frame and being frictionally held against displacement thereby, said element permitting said frames to accommodate themselves to food portions of various thicknesses placed therebetween, and also permitting one frame to swing relative to another.

5. A broiler rack comprising spaced frames one of which includes transversely extending portions connected by a plurality of longitudinally extending spaced rods, a transversely disposed element extending under one of said rods and over others thereof by which said element is held in a predetermined position, said element having upstanding ends arranged to pivotally receive the frame opposite the one carrying the rods and means forming a handle for lifting said frames.

6. In a broiler rack, a pair of opposing frames one of which comprises transversely extending portions connected by a plurality of longitudinally extending spaced rods, a connecting member between said frames extending transversely of said rods and having a portion intermediate its ends connected with one of the rods, said ends having hooks formed thereon to pivotally receive the opposite frame and means forming a handle for lifting said rack.

7. In a broiler rack, a frame, an opposing frame including a transverse portion having spaced members connected therewith, a yieldable connecting element for said frames extending under one of said members and over the other member, said element being secured by said members and having upstanding ends arranged to pivotally receive the first mentioned frame whereby to permit of a relative swinging movement between said frames, and means forming a handle for lifting said frames.

8. In a broiler rack, a frame, an opposing frame having spaced portions between the sides thereof, a connecting member for said frames extending under one of said portions and over a different portion on each side of said first mentioned portion, said member having upstanding ends arranged to pivotally receive the first mentioned frame whereby to permit of a relative swinging movement between said frames, an abutment on one of said spaced portions serving to hold said member against displacement in one direction, and means forming a handle for lifting said frames.

9. A broiler rack comprising a pair of oppositly disposed frames each having front and rear transverse portions connected by longitudinally extending rods, a transversely extending member formed of spring material and disposed adjacent the rear transverse portion of one of the frames, said member extending beneath one of the rods of the last mentioned frames and over others spaced therefrom and being tensioned by the rods whereby it is secured upon the last mentioned frame, said member having hooks formed on its opposite ends arranged to receive the rear transverse portion of the opposing frame and retaining means for holding said frames in closed position adjustable to release the same.

10. A broiler rack comprising a pair of adjustably connected frames, said frames having extended handle portions at one side thereof, a hand grip section secured upon each of said handle portions, said sections cooperating to form a single hand grip when the frames are in closed position and having alined transverse grooves or notches therein and a retaining ring slidable longitudinally of the handle and arranged to occupy a position within said grooves.

11. A broiler rack comprising a pair of adjustably connected grids, said grids having extended handle portions at one side thereof, a non-heat conducting hand grip section carried by each of said handle portions, one of said sections being recessed to receive the other, said sections cooperating when one is disposed within the other to afford a single hand grip and releasable retaining means for holding said frames in closed position.

12. A broiler rack comprising a pair of yieldably connected grids having extended handle portions, a hand grip section applied to each handle portion, one of said sections having a longitudinally extending recess for receiving the other section when the grids are in closed position in which position said sections afford a single hand grip by which to lift the rack.

13. A broiler rack comprising a pair of frames, means pivotally connecting the frames at their rear ends, handle portions extending from the front ends of said frames, non-heat conducting hand grip sections applied to said handle portions, said sections cooperating when the frames are in closed position to form a single hand grip for lifting said rack and a securing element for said sections adjustable longitudinally thereof to and from securing position.

14. A broiler rack comprising a pair of frames, a yieldable element extending transversely of said frames having its ends connected with one of the frames and being connected intermediate its ends with the other frame to permit said frames to accommodate themselves to meat portions therebetween varying in thickness, extended handle portions carried by said frames, members positioned upon said handle portions, one having a longitudinally extending recess formed therein and the other arranged to lie within said recess when the frames are in closed position and releasable means for holding said frames in closed position.

15. A broiler rack comprising a pair of adjustably connected frames, said frames having extended handle portions at one side thereof, a non-heat conducting hand grip section for each of said handle portions, the sections being grooved to receive said handle portions and cooperating when the frames are in closed position to afford a single hand grip for the rack and releasable retaining means for holding said sections in cooperating relationship.

16. A broiler rack comprising a pair of adjustably connected frames, said frames having extended handle portions at one side thereof each including spaced rods, hand grip sections for each handle portion interposed between said spaced rods and having grooves in which the rods are disposed, said sections cooperating to form a single hand grip when the frames are in closed position and releasable means for holding said frames in said closed position.

17. A broiler rack comprising a pair of adjustably connected frames, said frames having extended handle portions at one side thereof, each handle portion being in the form of a loop, a hand grip section on each loop, said sections forming a single hand grip when the frames are in closed position and serving to protect the hands against contacting with the loops and a holding member for said sections adjustable to release the same to permit movement of one frame relative to another.

18. A broiler rack comprising a pair of adjustably connected frames, said frames having extended handle portions at one side thereof, each handle portion including spaced rods having connecting portions at their outer ends, a hand grip section disposed between the rods of each handle portion, the rods being disposed in grooves formed in the hand grip sections, said sections being held against outward movement by said connecting portions and retaining means releasably securing said hand grip sections one adjacent another when the frames are in closed position.

19. A broiler rack comprising a pair of hingedly connected frames, said frames having extended handle portions at one side thereof, a non-heat conducting hand grip section secured upon each of said handle portions, one of said sections having a longitudinally extending recess for receiving the other section when the frames are inclosed position and releasable means for holding said sections one within the other.

20. A broiler rack comprising a pair of adjustably connected frames, said frames having extended handle portions at one side thereof, the handle portions each comprising spaced rods projecting from the frames and offset inwardly for a portion of their length adjacent their outer ends whereby relatively wide and narrow openings are afforded between the rods of each handle portion, a hand grip section disposed within the relatively narrow openings of each handle portion, said sections having grooves in the sides thereof for receiving the portions of the rods between which the sections are disposed, said sections being applied by positioning them within the relatively wide openings of the handle portions and moving them outwardly into said relatively narrow openings and retaining means for releasably holding said sections one adjacent another when the frames are in closed position.

MAURUS C. RECK.